(12) United States Patent
Kostenick et al.

(10) Patent No.: US 8,464,434 B1
(45) Date of Patent: Jun. 18, 2013

(54) HOLE AND COUNTERSINK MEASUREMENT SYSTEM

(75) Inventors: Paul G. Kostenick, Marysville, WA (US); Dario I. Valenzuela, Snohomish, WA (US); James Niemann Buttrick, Seattle, WA (US); Arlen Ray Pumphrey, Lynnwood, WA (US); Michael M. Stepan, Langley, WA (US)

(73) Assignee: The Boeing Company, Chicago, IL (US)

( * ) Notice: Subject to any disclaimer, the term of this patent is extended or adjusted under 35 U.S.C. 154(b) by 359 days.

(21) Appl. No.: 12/882,741

(22) Filed: Sep. 15, 2010

(51) Int. Cl.
  *G01B 7/13* (2006.01)
  *G01B 21/14* (2006.01)

(52) U.S. Cl.
  USPC .................. 33/542; 33/543; 33/557

(58) Field of Classification Search
  USPC ............. 33/531, 542, 542.1, 543, 544, 544.1, 33/544.4, 557, 560, 833, 836
  See application file for complete search history.

(56) References Cited

U.S. PATENT DOCUMENTS

| | | | | |
|---|---|---|---|---|
| 1,459,896 A * | 6/1923 | John | | 33/544 |
| 3,823,484 A * | 7/1974 | Dunn | | 33/560 |
| 4,455,754 A * | 6/1984 | Benjamin | | 33/557 |
| 4,872,269 A * | 10/1989 | Sattmann | | 33/552 |
| 4,982,505 A | 1/1991 | Pocci | | |
| 4,996,492 A * | 2/1991 | Anderson et al. | | 324/687 |
| 5,010,658 A | 4/1991 | Griffith et al. | | |
| 5,021,740 A * | 6/1991 | Sarr et al. | | 324/687 |
| 5,189,808 A * | 3/1993 | Evans et al. | | 33/836 |
| 5,319,860 A | 6/1994 | Pocci | | |
| 5,758,433 A * | 6/1998 | Alberts | | 33/836 |
| 6,088,923 A * | 7/2000 | Guerin | | 33/542 |
| 6,154,279 A * | 11/2000 | Thayer | | 356/602 |
| 7,363,721 B2 * | 4/2008 | Nappier | | 33/542 |
| 7,542,135 B2 * | 6/2009 | Mead et al. | | 356/237.6 |
| 7,665,221 B2 | 2/2010 | Bennison et al. | | |
| 7,743,526 B2 * | 6/2010 | Foletti et al. | | 33/544.4 |
| 2008/0144045 A1 * | 6/2008 | Bennison et al. | | 356/614 |
| 2012/0151788 A1 * | 6/2012 | Miller et al. | | 33/701 |

FOREIGN PATENT DOCUMENTS

FR  2678726 A1 *  1/1993

OTHER PUBLICATIONS

"Dimentron Plug Inside Diameter Gages", pp. 9-39 to 9-42, retrieved Sep. 14, 2010 http://www.mahr.com/scripts/relocateFile.php?ContentID=5748&NodeID=11068&FileID=4072&ContentDataID=34698&save=0.

* cited by examiner

Primary Examiner — R. A. Smith
(74) Attorney, Agent, or Firm — Yee & Associates, P.C.

(57) ABSTRACT

A method and apparatus for measuring diameters of holes and countersinks. A tip of a countersink measurement system may be moved to engage a countersink for a hole. A diameter of the countersink may be measured in response to the tip of the countersink measurement system engaging the countersink. A probe may be moved through the tip of the countersink measurement system into a channel for the hole, while the tip is engaged with the countersink. A number of diameters for the channel may be measured as the probe moves in the hole.

21 Claims, 13 Drawing Sheets

HOLE AND COUNTERSINK MEASUREMENT SYSTEM

BACKGROUND INFORMATION

1. Field

The present disclosure relates generally to manufacturing and, in particular, to measuring features formed in objects. Still more particularly, the present disclosure relates to a method and apparatus for measuring holes and countersinks in objects.

2. Background

In manufacturing aircraft, different parts may be attached to each other. For example, without limitation, a wing for an aircraft may be manufactured by attaching skin panels to spars and ribs. These parts may be attached to each other using a number of different mechanisms. For example, without limitation, a skin panel may be attached to a spar and/or through bonding with an adhesive and/or the use of fasteners. When fasteners are used to attach these parts to each other, holes may be formed in the parts. Thereafter, fasteners may be placed through the holes in the parts and then secured to connect the parts to each other.

With an aircraft part, such as a skin panel for a wing, fasteners may be placed into holes formed in the aircraft part and having countersinks. The fasteners may be placed into the holes such that the fastener heads are substantially flush with a surface of the aircraft part. This type of placement for the fasteners may reduce drag generated by the fasteners.

In forming holes in parts, the holes may have desired dimensions. If the holes do not meet the desired dimensions, then the part may be reworked and/or discarded. Examples of dimensions that may be measured for holes include, for example, without limitation, a diameter of a hole, a depth for a hole, an angle for the hole, and/or other suitable dimensions. Further, features for the hole, such as, for example, without limitation, a roundedness or tilt of the hole may also be measured.

Additionally, dimensions of countersinks for holes may also be measured. These dimensions may include, for example, without limitation, a number of diameters of a countersink, a depth of a countersink, an angle for a countersink, and/or other suitable dimensions. The angle may be, for example, without limitation, the angle for an edge of the countersink relative to a centerline through the countersink. The centerline through the countersink may be substantially perpendicular to the surface and/or at an angle relative to the surface.

Currently, the measurement of diameters of holes may be performed by an operator. The operator may use a first tool to measure the diameter of the hole. The operator may then use a second tool to measure the diameters, depth, angle, roundedness, and/or other dimensions of the countersink for the hole. These operations may take from about one minute to about two minutes per hole.

As a result, the measurement of holes in parts may be time consuming. For example, without limitation, a wing panel for a wing may have about 6,000 holes. As a result, the time needed to measure the holes may take more time than desired. This increase in time may delay the production of the aircraft and also may increase the cost to produce the aircraft.

Therefore, it would be advantageous to have a method and apparatus that takes into account at least some of the issues discussed above as well as other possible issues.

SUMMARY

In one advantageous embodiment, an apparatus may comprise a countersink measurement system and a diameter measurement system. The countersink measurement system may have a tip and may be configured to measure a diameter of a countersink for a hole. The diameter measurement system may be associated with the countersink measurement system. The diameter measurement system may have a probe configured to measure a number of diameters for a channel in the hole.

In another advantageous embodiment, a hole measurement system may comprise a housing, a countersink measurement system, a diameter measurement system, and a processor unit. The countersink measurement system may be associated with the housing. The countersink measurement system may comprise a tip configured to engage a countersink for a hole, a biasing mechanism, and a number of sensors. The countersink measurement system may be configured to measure a diameter of the countersink for the hole when the tip is engaged with the countersink. The tip of the countersink measurement system may be a structure having a conical shape. The biasing mechanism may be configured to bias the tip of the countersink measurement system in a first direction along an axis. The tip of the countersink measurement system may be in a first position when the tip is not engaged with the countersink and may be in a second position when the tip of the countersink measurement system is engaged with the countersink. The number of sensors may be configured to measure a movement of the tip of the countersink measurement system along the axis from the first position to the second position. The diameter measurement system may be associated with the housing. The diameter measurement system may be configured to measure a diameter of a channel for the hole about every 0.0005 inches. The diameter measurement system may comprise a probe, a carriage, a motor, a number of rods, a ball screw, and a rotational motor. The diameter measurement system may be configured to move the probe through the tip of the countersink measurement system in a first direction along the axis into a first end of the channel towards a second end of the channel when the tip of the countersink measurement system is engaged with the countersink; rotate the probe about the axis; move the probe in a second direction along the axis back out of the first end of the channel after rotating the probe; and measure the number of diameters for the channel while the probe moves in at least one of the first direction and the second direction. The probe may be associated with the carriage. The motor may be configured to move the carriage along the axis. The carriage may be configured to move along the number of rods and the axis. The ball screw may be connected to the motor and the carriage. Operation of the motor turns the ball screw to cause the carriage to move along the number of rods and along the axis. The rotational motor may be configured to rotate the probe about the axis. The processor unit may be configured to control operation of the countersink measurement system and the diameter measurement system; receive data for the diameter of the countersink and the number of diameters for the channel; and generate an indication of whether the hole meets a requirement for the hole using the diameter of the countersink and the number of diameters measured for the channel.

In yet another advantageous embodiment, a method may be provided for measuring diameters of holes. A tip of a countersink measurement system may be moved to engage a countersink for a hole. A diameter of the countersink may be measured in response to the tip of the countersink measurement system engaging the countersink. A probe may be moved through the tip of the countersink measurement system into a channel for the hole while the tip is engaged with the countersink. A number of diameters for the channel may be measured as the probe moves in the channel.

In still yet another advantageous embodiment, a method may be provided for measuring diameters of holes and countersinks. A tip of a countersink measurement system may be moved to engage a countersink for a hole. A diameter of the countersink may be measured in response to the tip of the countersink measurement system engaging the countersink. A probe may be moved through the tip of the countersink measurement system into a first end of a channel for the hole in a first direction along an axis, extending through the tip of the countersink measurement system, towards a second end of the channel, while the tip is engaged with the countersink. The probe may be rotated about the axis. The probe may be moved in a second direction along the axis towards the first end of the channel. A number of diameters may be measured for the channel as the probe moves in the channel. An indication of whether the hole meets a requirement for the hole using the diameter of the countersink and the number of diameters for the channel may be generated.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
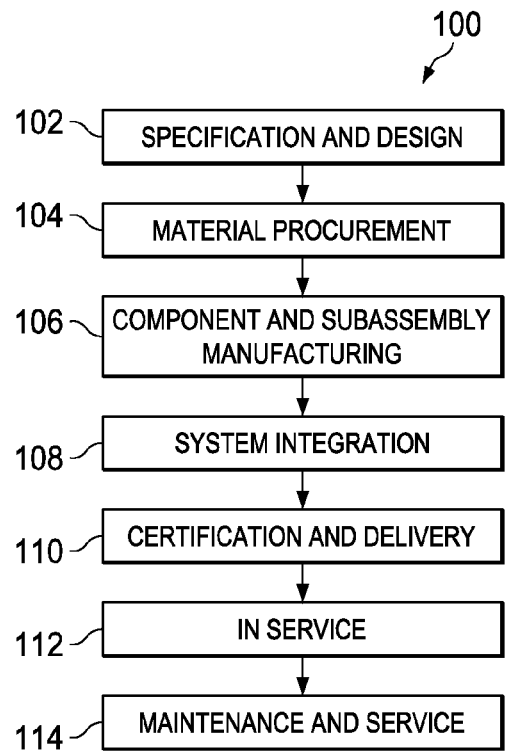
FIG. 1 is an illustration of an aircraft manufacturing and service method in accordance with an advantageous embodiment.
Figure 2:
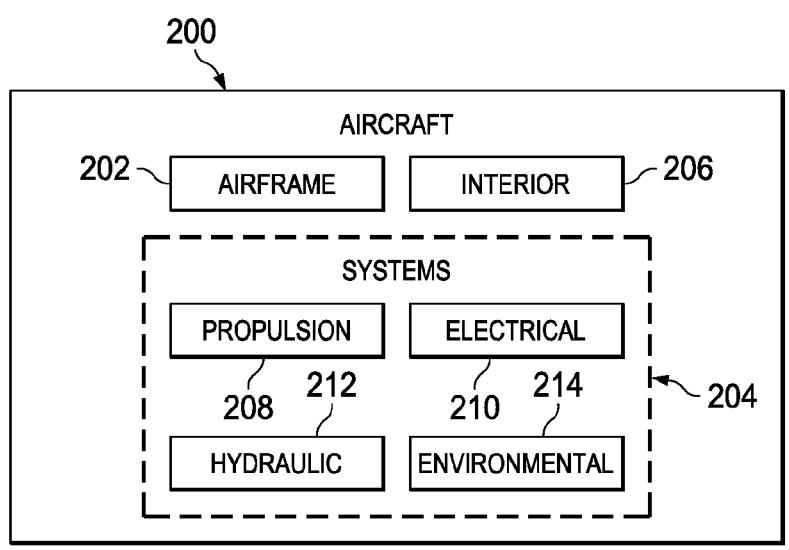
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, without limitation, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, without limitation, the different advantageous embodiments recognize and take into account that with current techniques, the measuring of holes may be performed using two tools. One tool may be used to measure the diameter in a channel for the hole. A second tool may be used to measure the diameter of the countersink for a hole. The diameter of the countersink is the diameter at the surface in which the hole is located. Further, additional tools may be needed to measure the depth, angle, and/or other dimensions of a countersink. The different advantageous embodiments recognize and take into account that this process may take more time than desired.

Thus, the different advantageous embodiments may provide a method and apparatus for measuring holes. The measuring of the hole may include a diameter of the hole as well as a diameter of the countersink for the hole. In one advantageous embodiment, an apparatus may comprise a housing, a counter-measurement system associated with the housing, and a diameter measurement system associated with the housing. The countersink measurement system may comprise a tip configured to engage a hole with a countersink. The countersink measurement system may be configured to measure a diameter of the countersink for the hole when the tip is engaged with the hole. The diameter measurement system may comprise a probe. The diameter measurement system may be configured to move the probe along an axis extending through the tip of the countersink system into a channel for the hole when the tip is engaged with the hole. The diameter measurement system may also be configured to generate measurements for a number of diameters for the channel.

Figure 3:
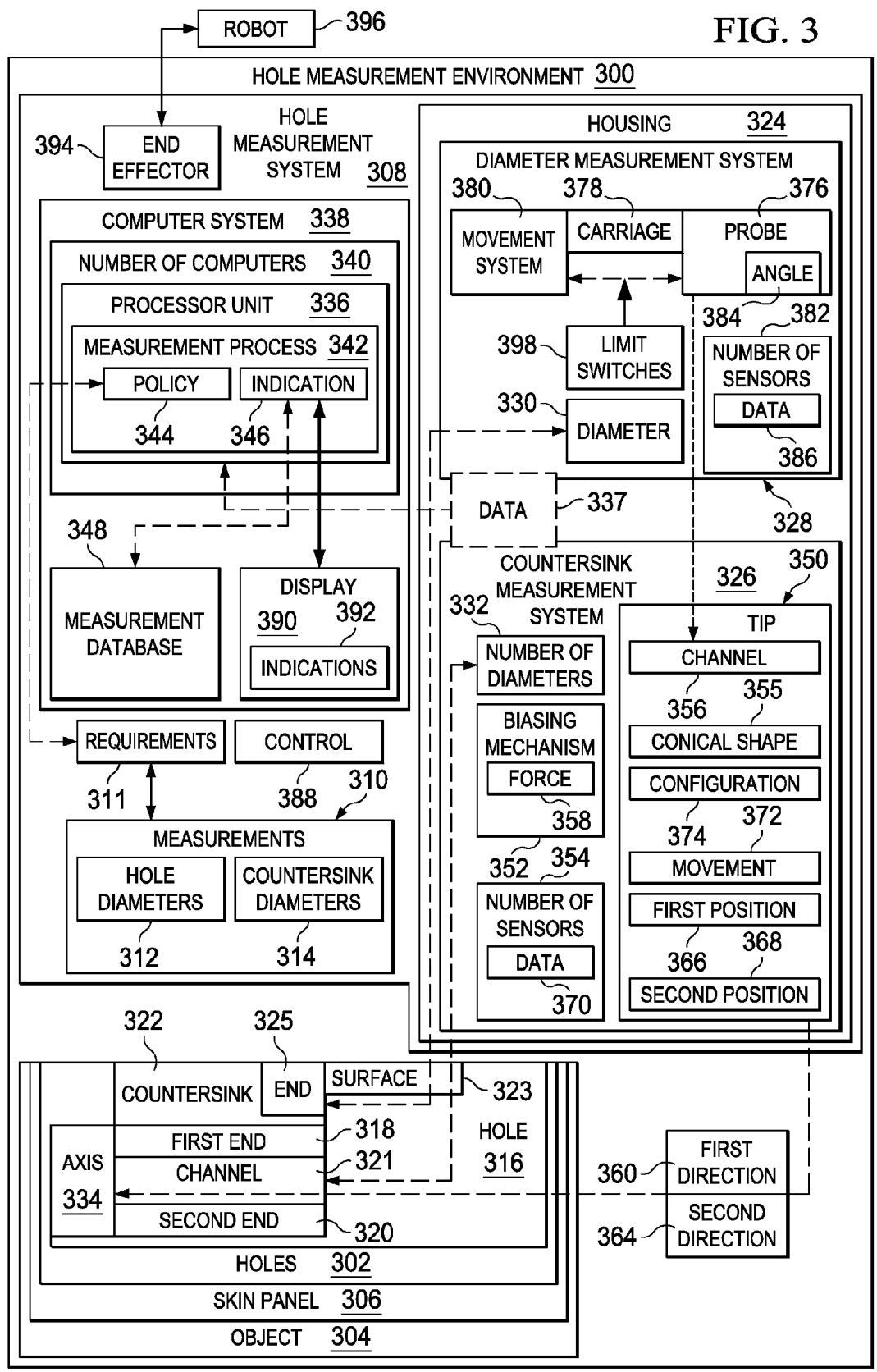
FIG. 3 is an illustration of a hole measurement environment in accordance with an advantageous embodiment.

With reference now to FIG. 3, an illustration of a hole measurement environment is depicted in accordance with an advantageous embodiment. In this example, hole measurement environment 300 may be used to measure holes 302 in object 304. Object 304 may be, for example, without limitation, a part, a subassembly, and/or a structure for aircraft 200 in FIG. 2. For example, without limitation, object 304 may be skin panel 306 for use in aircraft 200 in FIG. 2.

In these illustrative examples, hole measurement system 308 may be used to generate measurements 310 of holes 302. Measurements 310 may be used to determine whether holes 302 meet requirements 311. If holes 302 do not meet requirements 311, rework of holes 302 may occur. Additionally, object 304 may be replaced and/or discarded depending on the analysis of measurements 310 made using hole measurement system 308. In these illustrative examples, measurements 310 include at least one of hole diameters 312, countersink diameters 314, and other suitable types of measurements.

In these illustrative examples, hole measurement system 308 may comprise housing 324, countersink measurement system 326, and diameter measurement system 328. Countersink measurement system 326 and diameter measurement system 328 may be associated with housing 324.

In these illustrative examples, a first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or as an extension of the second component.

As one illustrative example, hole 316 may have channel 321 and countersink 322. Channel 321 may have first end 318 and second end 320. In other words, channel 321 may be the portion of hole 316 located between first end 318 and second end 320. Further, channel 321 may have a substantially same diameter along axis 334 extending through first end 318 and second end 320 of channel 321. In these illustrative examples, channel 321 may be a hole that does not pass substantially all the way through object 304. In other illustrative examples, channel 321 may be a through hole passing substantially all the way through object 304.

Countersink 322 may be the portion of hole 316 located between first end 318 of channel 321 and surface 323 of object 304. As depicted, end 325 may be substantially opposite to first end 318. Further, end 325 of countersink 322 may be substantially flush with surface 323 of object 304 in these examples. Still further, end 325 of countersink 322 is an end for hole 316.

Countersink measurement system 326 may be configured to measure diameter 330 for countersink 322 at end 325 of countersink 322. Diameter measurement system 328 may be configured to measure number of diameters 332 for channel 321. Number of diameters 332 for channel 321 may include diameters located between first end 318 and second end 320.

Number of diameters 332 for hole 316 may vary along axis 334 extending through first end 318 and second end 320 within hole 316. This variance may be undesired with respect to the design and specifications for hole 316.

Diameter 330 of countersink 322 and number of diameters 332 for channel 321 may be sent to processor unit 336 for processing. In some cases, data 337 may be generated by countersink measurement system 326 and diameter measurement system 328. Data 337 may be used to generate or calculate diameter 330 and number of diameters 332.

In these illustrative examples, processor unit 336 may be located in computer system 338. Computer system 338 may comprise number of computers 340 in which processor unit 336 may be located. In these examples, measurement process 342 may run on processor unit 336 in number of computers 340.

Measurement process 342 may be implemented by running software in the form of program code configured to be run on processor unit 336. In other examples, measurement process 342 may be embodied in hardware or a combination of hardware and software. The hardware may be, for example, without limitation, a circuit system, an application specific integrated circuit (ASIC), a programmable logic device, or some other suitable type of hardware configured to perform operations for measurement process 342.

Diameter 330 and number of diameters 332 may be processed by measurement process 342 using policy 344. Policy 344 may comprise a number of rules regarding desired ranges for diameters with countersinks and/or diameters of holes for different parts in these illustrative examples. For example, without limitation, policy 344 may indicate desired diameters for countersinks and/or holes along with selected tolerances for the desired diameters.

As depicted in these examples, measurement process 342 may generate indication 346 of whether hole 316 meets requirements 311 and/or meets the rules in policy 344. For example, without limitation, indication 346 may indicate whether diameter 330 and number of diameters 332 are within selected tolerances based on policy 344.

Indication 346 may be displayed to an operator making measurements of holes 302 in object 304 using hole measurement system 308. In other illustrative examples, indication 346 may be placed into measurement database 348 along with other measurements for other holes in holes 302 for object 304.

In this illustrative example, countersink measurement system 326 may comprise tip 350, biasing mechanism 352, and number of sensors 354. Tip 350 may be configured to engage countersink 322 at first end 318. Tip 350 also may have channel 356. Additionally, tip 350 may be a structure having conical shape 355 in these examples.

Biasing mechanism 352 may apply force 358 on tip 350. Force 358 is in first direction 360 along axis 334. Axis 334 may extend through channel 356 in tip 350. When housing 324 is moved towards end 325 of countersink 322, tip 350 may be moved in second direction 364 along axis 334. In these illustrative examples, tip 350 may have first position 366 when tip 350 is not engaged with countersink 322. When tip 350 is engaged in hole 316, tip 350 may have second position 368.

Biasing mechanism 352 may take a number of different forms. For example, without limitation, biasing mechanism 352 may be a spring, or some other suitable type of biasing mechanism.

In these illustrative examples, number of sensors 354 may generate data 370 about movement 372 of tip 350. Data 370, along with information about configuration 374 of tip 350, may be used by processor unit 336 to calculate diameter 330 for countersink 322.

Diameter measurement system 328 may comprise probe 376, carriage 378, movement system 380, and number of sensors 382. In this illustrative example, probe 376 may be associated with carriage 378. Movement system 380 may move carriage 378 with probe 376 in first direction 360 and second direction 364 along axis 334.

Probe 376 may move through channel 356 of tip 350 along axis 334 in first direction 360, while tip 350 is engaged with countersink 322. Probe 376 may enter channel 321 at first end 318. Probe 376 may move through channel 321 towards second end 320. Thereafter, probe 376 may be rotated by angle 384 by movement system 380. Probe 376 may then be moved back in second direction 364 away from second end 320 of channel 321 towards first end 318.

As probe 376 moves within channel 321 between first end 318 and second end 320, number of sensors 382 may generate data 386. In these examples, data 386 may be used to identify number of diameters 332 for channel 321.

In these illustrative examples, when tip 350 engages second end 320 of channel 321, an operator may operate control 388 to generate data 370. In addition, when activating control 388, movement system 380 may move probe 376 to generate data 386 for measuring number of diameters 332 for channel 321.

In these illustrative examples, this process may take from about ten seconds to about fifteen seconds. This amount of time may be much less as compared to the current time for measuring holes that may take from about one minute to about two minutes. In this manner, the measurement of holes may be made more quickly using the different advantageous embodiments.

In addition, if indication 346 is generated at housing 324, then an operator may mark holes in holes 302 that may not meet requirements 311 for diameters for holes 302. The holes may be marked in a number of different ways. For example, without limitation, the holes may be marked by using a writing instrument to mark the holes, creating an indication in a model for object 304, and/or performing some other suitable operation to mark the holes. In some illustrative examples, the operator may create a list of the holes in holes 302 that do not meet requirements 311 for diameters for holes 302. In this manner, the marked holes may be reworked or parts may be replaced and/or discarded as needed.

After holes 302 have been measured, display 390 of holes 302 on object 304 may be presented in computer system 338. Display 390 also may include indications 392 in which each indication in indications 392 identifies whether a hole has diameters that meet the desired ranges in requirements 311 and/or are within the selected tolerances identified in policy 344.

In the different advantageous embodiments, tip 350 may be a removable attachment for countersink measurement system 326. For example, tips of different sizes may be used with countersink measurement system 326.

Further, probe 376 may also be a removable attachment for diameter measurement system 328. Probe 376 may be replaced with other probes having different sizes. For example, probe 376 may have a size configured for use with a hole in holes 302 designed to have a channel with a particular diameter along axis 334. To measure a diameter for a hole designed to have a channel with a different diameter along axis 334, a different probe having a different size may be used with diameter measurement system 328.

The illustration of hole measurement environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, processor unit 336 and measurement process 342 may be associated with housing 324. In these illustrative examples, housing 324 may be a portable housing. More specifically, housing 324 may be handheld. In other words, housing 324 may have a configuration that is suitable for manipulation by one and/or two hands of a human operator. In other advantageous embodiments, hole measurement system 308 may take the form of end effector 394 for use with robot 396.

Additionally, in other illustrative examples, the extent to which probe 376 may move along axis 334 may be limited. For example, without limitation, diameter measurement system 328 may include limit switches 398. Limit switches 398 may limit how far probe 376 is allowed to move along axis 334.

Figure 4:
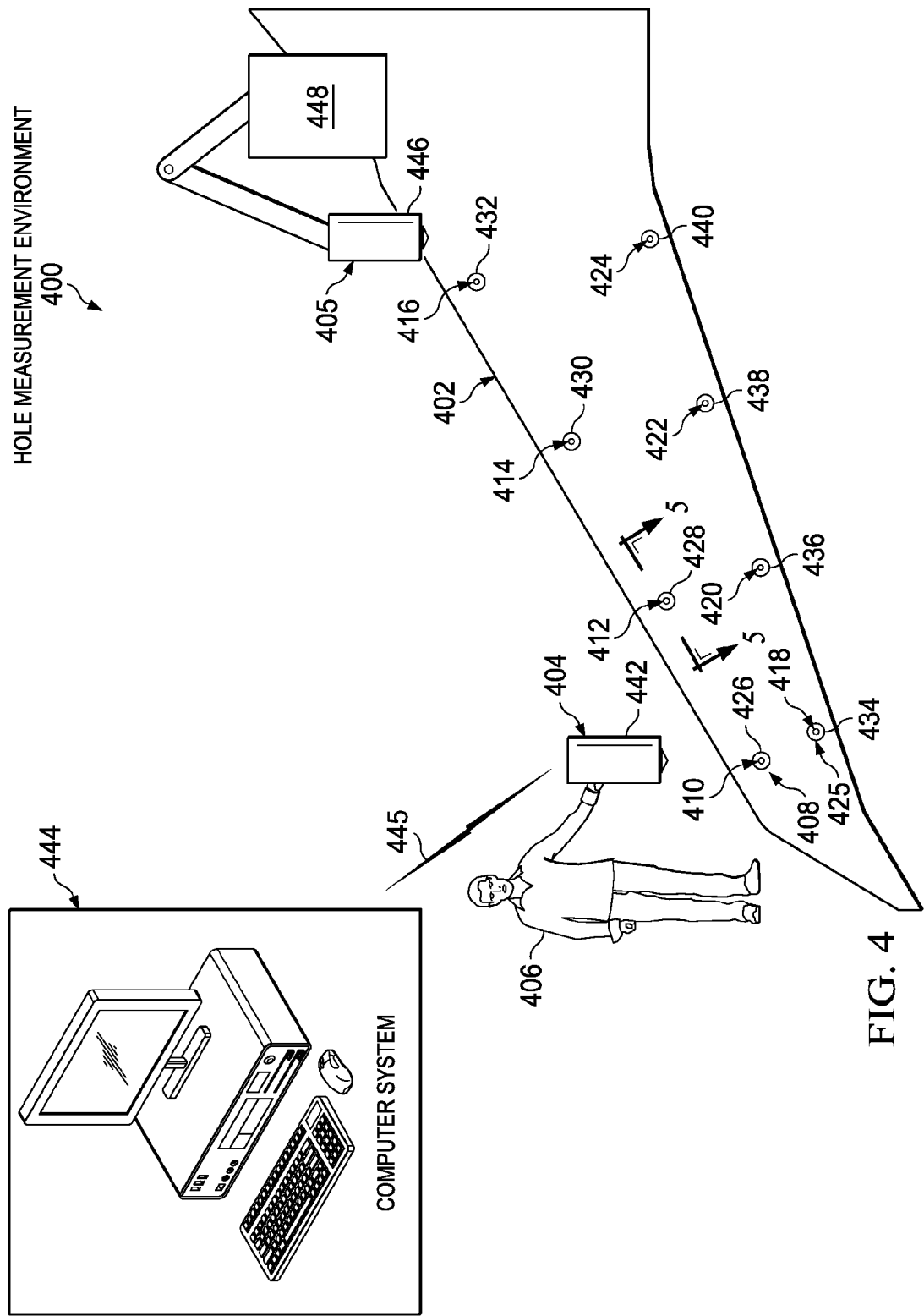
FIG. 4 is an illustration of a hole measurement environment in accordance with an advantageous embodiment.

With reference now to FIG. 4, an illustration of a hole measurement environment is depicted in accordance with an advantageous embodiment. In this illustrative example, hole measurement environment 400 is an example of one implementation for hole measurement environment 300 in FIG. 3.

As depicted, hole measurement environment 400 may include wing panel 402, hole measurement system 404, and hole measurement system 405. Wing panel 402 may be part of, for example, without limitation, aircraft 200 in FIG. 2. Hole measurement system 404 and hole measurement system 405 may be examples of implementation for hole measurement system 308 in FIG. 3.

In this illustrative example, hole measurement system 404 may be a handheld system that may be operated by operator 406. Operator 406 may use hole measurement system 404 to measure holes 408 in wing panel 402. Holes 408 may include holes 410, 412, 414, 416, 418, 420, 422, and 424. In this depicted example, holes 408 may have countersinks 425. For example, without limitation, holes 410, 412, 414, 416, 418, 420, 422, and 424 may have countersinks 426, 428, 430, 432, 434, 436, 438, and 440.

Hole measurement system 404 may include a countersink measurement system (not shown) and a diameter measurement system (not shown) within housing 442 for hole measurement system 404. The countersink measurement system may measure the diameters of countersinks 425. The diameter measurement system may measure the number of diameters for each of holes 408. These measurements and/or other data generated by hole measurement system 404 may be sent to computer system 444 for hole measurement system 404.

Computer system 444 may be in a location remote to housing 442 for hole measurement system 404. Further, data may be sent to computer system 444 using wireless communications links 445 in this depicted example.

In this illustrative example, computer system 444 may process the data received to generate information about holes 408. This information may include, for example, without limitation, diameters of holes 408 and/or countersinks 425, data to calculate diameters of holes 408 and/or countersinks 425, an indication of whether holes 408 and/or countersinks 425 meet a number of requirements, and/or other suitable types of information. The indication may be, for example, without limitation, indication 346 in FIG. 3.

Additionally, hole measurement system 405 may also be configured to generate measurements of diameters for holes 408 and countersinks 425. Hole measurement system 405 may have a configuration similar to hole measurement system 404 as described above.

However, hole measurement system 404 may not be a handheld system in this illustrative example. Instead, hole measurement system 405 may take the form of end effector 446 for robot 448 in this illustrative example. Hole measurement system 405 may be moved over wing panel 402 by robot 448 to generate measurements and/or other data for holes 408 and countersinks 425.

Figure 5:
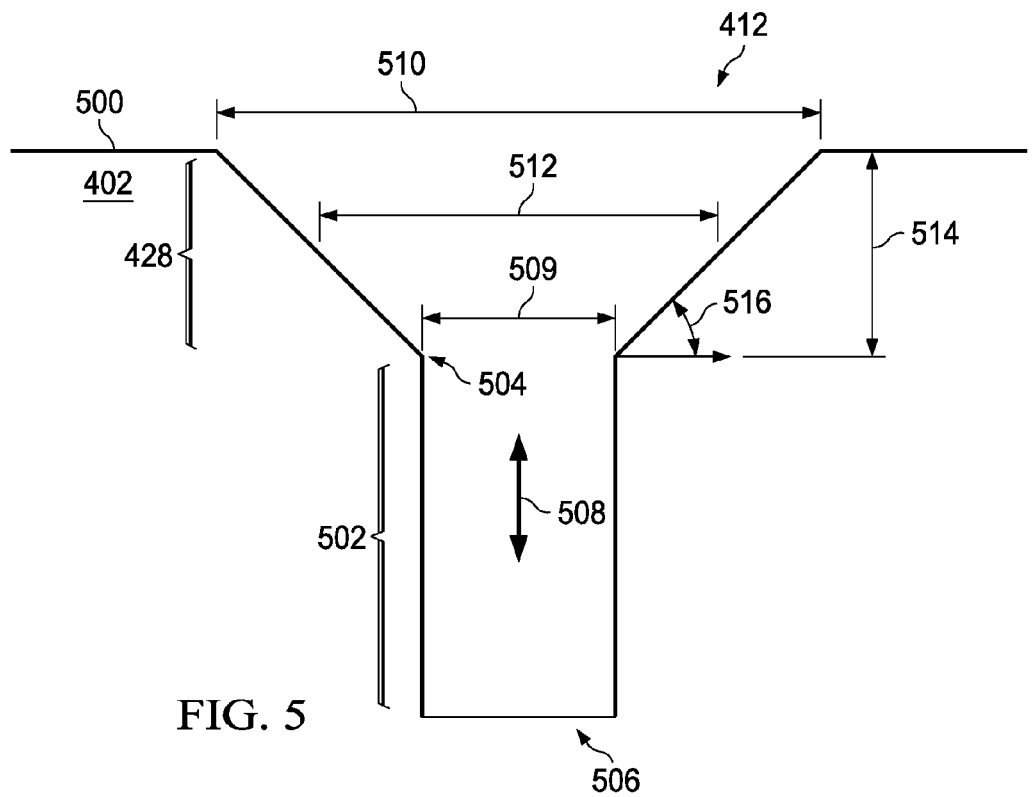
FIG. 5 is an illustration of a cross-sectional view of a hole depicted in accordance with an advantageous embodiment.

With reference now to FIG. 5, an illustration of a cross-sectional view of a hole is depicted in accordance with an advantageous embodiment. In this illustrative example, a cross-sectional view of hole 412 from FIG. 4 may be illustrated taken along lines 5-5 in FIG. 4.

As depicted in this example, hole 412 may be a hole in surface 500 of wing panel 402. Hole 412 may have countersink 428 and channel 502. In this illustrative example, channel 502 may extend from first end 504 to second end 506 of channel 502. Further, channel 502 may be designed to have substantially the same diameter 509 along axis 508 extending through channel 502 from first end 504 to second end 506.

In this depicted example, countersink 428 has diameter 510. Diameter 510 is the diameter of countersink 428 at a level substantially parallel to surface 500. Diameter 510 may be measured using, for example, without limitation, countersink measurement system 326 in hole measurement system 308 in FIG. 3. As depicted, diameter 510 of countersink 428 is larger than diameters of countersink 428 at other levels of countersink 428 between surface 500 and first end 504. For example, diameter 510 is smaller than diameter 512 of countersink 428.

Additionally, countersink 428 has depth 514 and angle 516. Depth 514 and angle 516 may be measured using hole measurement system 308 in FIG. 3 based on diameter 510 measured for countersink 428 and a number of diameters along axis 508 from first end 504 to second end 506 of channel 502 measured for channel 502.

With reference now to FIGS. 6-12, illustrations of a hole measurement system are depicted in accordance with an advantageous embodiment. In these illustrative examples, hole measurement system 600 may be an example of one implementation for hole measurement system 308 in FIG. 3, hole measurement system 404 in FIG. 4, and/or hole measurement system 405 in FIG. 4.

Figure 6:
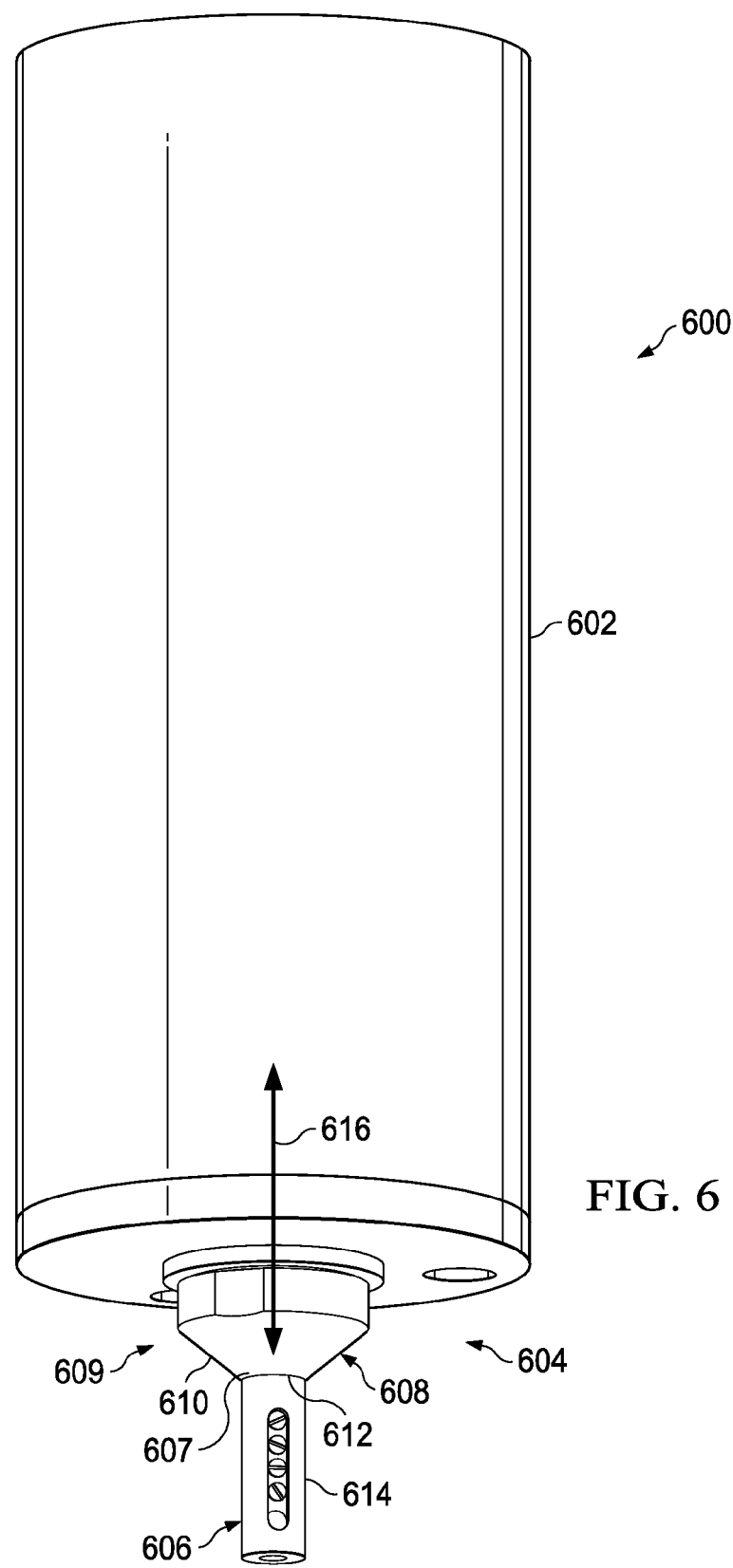
FIG. 6 is an illustration of a hole measurement system in accordance with an advantageous embodiment.

Turning now to FIG. 6, an illustration of hole measurement system 600 is depicted in accordance with an advantageous embodiment. In this illustrative example, hole measurement system 600 may include housing 602, countersink measurement system 604 and diameter measurement system 606. Countersink measurement system 604 and diameter measurement system 606 may be associated with housing 602 in these depicted examples.

Countersink measurement system 604 may include tip 608 having end 607. Tip 608 may have conical shape 610 in this illustrative example. Further, tip 608 may have channel 612 extending through tip 608. In this example, tip 608 may have first position 609. Tip 608 may be configured to engage holes in objects, such as holes 302 in object 304 in FIG. 3 and/or holes 408 in wing panel 402 in FIG. 4. Other portions of countersink measurement system 604 may be located within housing 602. These other portions of countersink measurement system 604 are not shown in this view.

In this illustrative example, diameter measurement system 606 may include probe 614 that may move in the direction of axis 616 through channel 612 in tip 608. Other portions of diameter measurement system 606 may be located within housing 602. These other portions of diameter measurement system 606 are not shown in this view.

Figure 7:
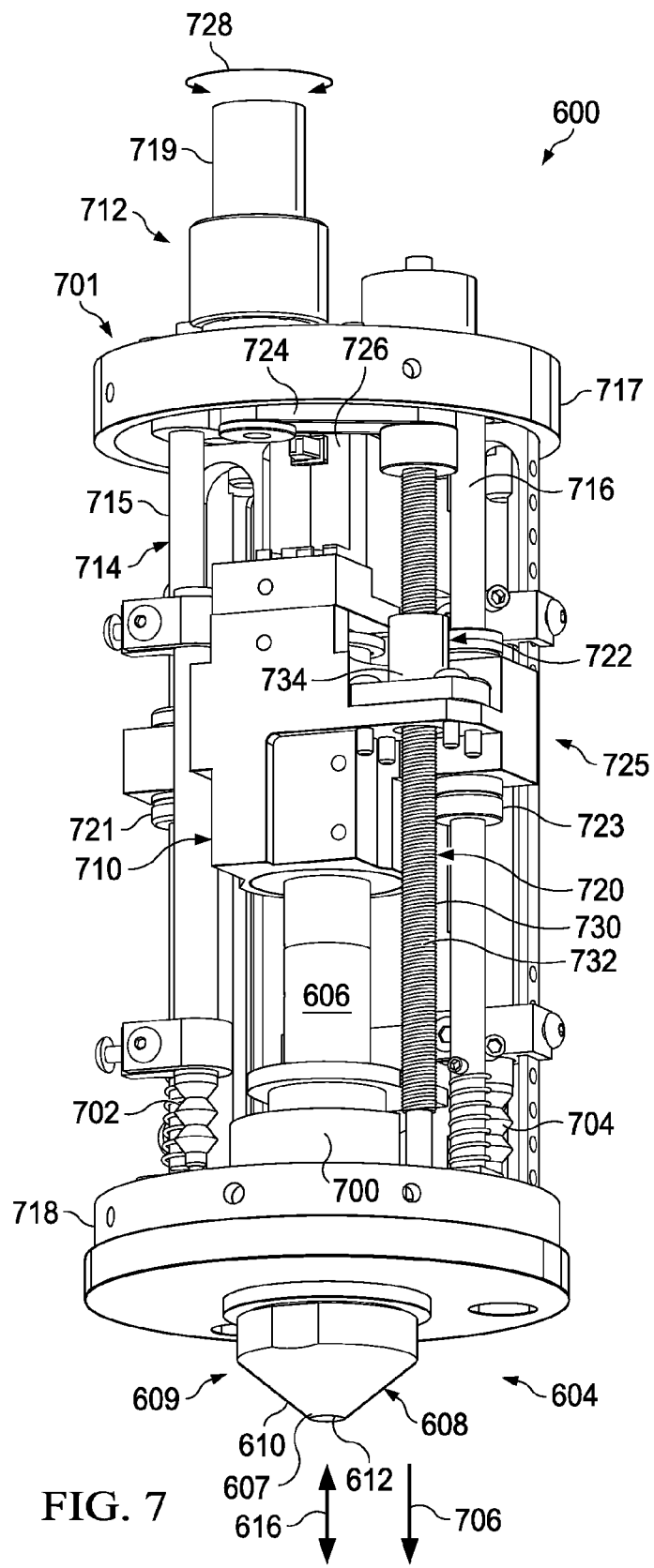
FIG. 7 is an illustration of an exposed front view of a hole measurement system in accordance with an advantageous embodiment.

With reference now to FIG. 7, an illustration of an exposed front view of hole measurement system 600 is depicted in accordance with an advantageous embodiment. In this illustrative example, hole measurement system 600 may be depicted with housing 602 in FIG. 6 removed. In this manner, a more detailed view of countersink measurement system 604 and diameter measurement system 606 may be seen. Further, hole measurement system 600 may be seen from front side 701.

As depicted, countersink measurement system 604 may include tip 608, biasing mechanism 700, sensor 702, and sensor 704. Biasing mechanism 700 may comprise a spring (not shown in this view) that may bias tip 608 in the direction of arrow 706. In particular, biasing mechanism 700 may bias tip 608 to be in first position 609.

Sensor 702 and sensor 704 may generate data that may be used to identify the diameter of a countersink at different levels of the countersink. In some illustrative examples, the data generated by sensor 702 and sensor 704 may be the actual diameters of the countersink at different levels of the countersink.

Diameter measurement system 606 may include probe 614 in FIG. 6, carriage 710, and movement system 712. Probe 614 in FIG. 6 may not be seen in this illustrative example because probe 614 may be in a retracted position. Carriage 710 may be configured to allow probe 614 in FIG. 6 to move in the direction of axis 616 along frame 714. In this depicted example, carriage 710 may have position 725.

Frame 714 may comprise elongate member 715, elongate member 716, structure 717, and structure 718. Elongate member 715 and elongate member 716 may be referred to as linear guide rods in this illustrative example. Structure 717 and structure 718 may be associated with housing 602.

Further, elongate member 715, elongate member 716, structure 717, and structure 718 may provide support for hole measurement system 600. Bearing 721 and bearing 723 may also be associated with frame 714 in this example.

As depicted, movement system 712 may comprise motor 719, elongate member 720, fastener 722, belt 724, and rotational motor 726. Motor 719 may be configured to rotate about axis 616 in the direction of arrow 728 to move belt 724. For example, without limitation, rotation of motor 719 may cause movement of belt 724. Movement of belt 724 may cause rotation of elongate member 720. Elongate member 720 may have threads 730. In this illustrative example, elongate member 720 may take the form of ball screw 732.

In this depicted example, rotation of ball screw 732 may cause fastener 722 to move in the direction of axis 616 relative to ball screw 732. Fastener 722 may take the form of nut 734 in this example. Nut 734 may be associated with carriage 710. In this manner, rotation of ball screw 732 may cause movement of carriage 710 in the direction of axis 616 relative to ball screw 732.

Further, rotational motor 726 may be configured to rotate probe 614, in FIG. 6, for diameter measurement system 606 about axis 616 in the direction of arrow 728. In this manner, probe 614 may be rotated by a number of angles to measure different types of holes.

Figure 8:
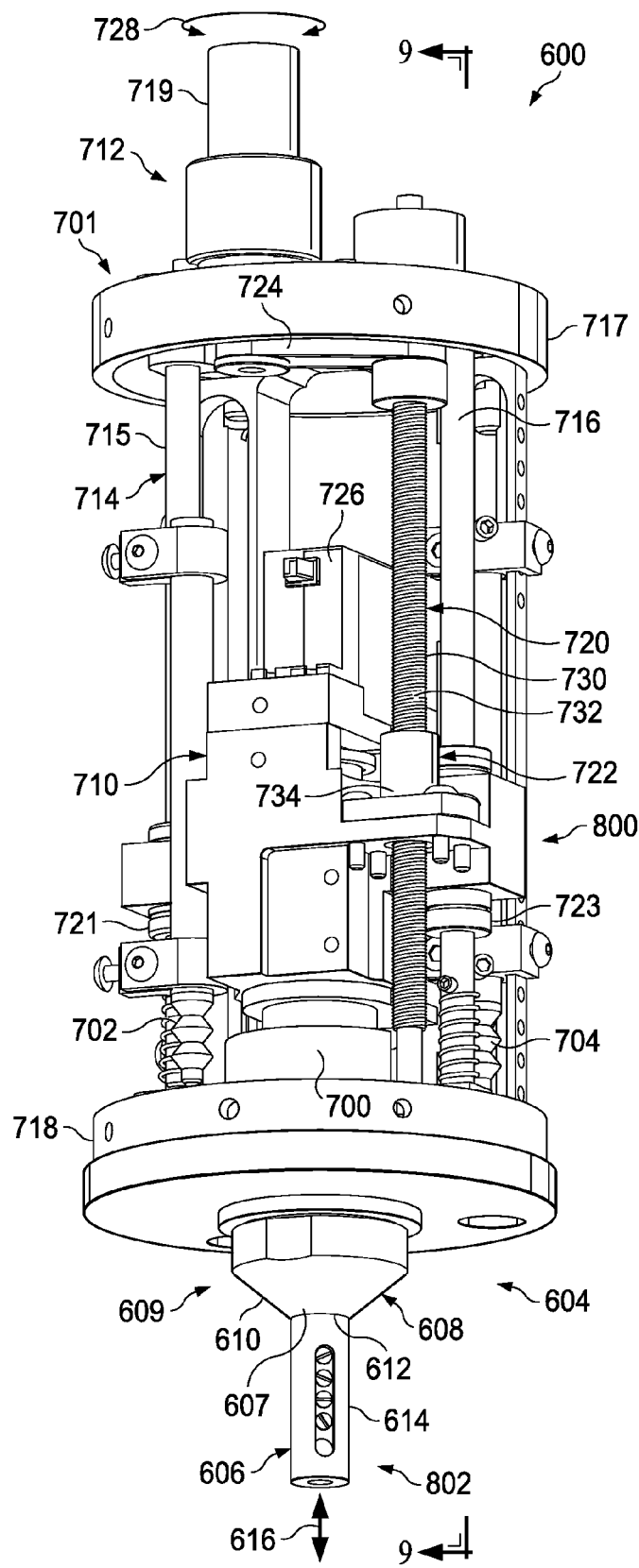
FIG. 8 is an illustration of a hole measurement system with a probe in an extended position in accordance with an advantageous embodiment.

Turning now to FIG. 8, an illustration of hole measurement system 600 with probe 614 in an extended position is depicted in accordance with an advantageous embodiment. In this illustrative example, carriage 710 may have moved along axis 616 from position 725 in FIG. 7 to position 800. This movement of carriage 710 may move probe 614 into extended position 802.

Figure 9:
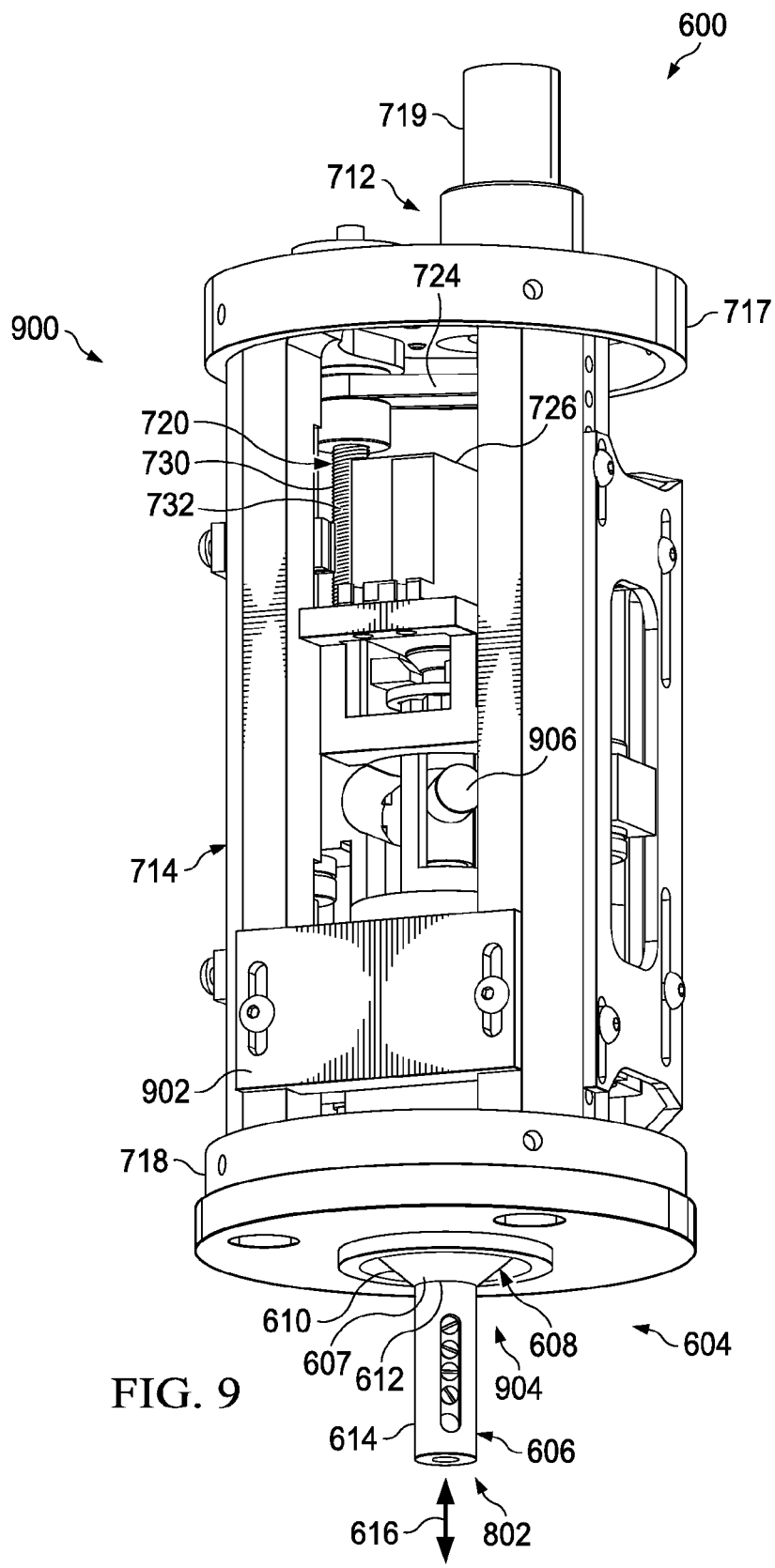
FIG. 9 is an illustration of another exposed view of a hole measurement system in accordance with an advantageous embodiment.

With reference now to FIG. 9, an illustration of another exposed view of hole measurement system 600 is depicted in accordance with an advantageous embodiment. In this illustrative example, hole measurement system 600 may be seen from back side 900, viewed from lines 9-9 in FIG. 8.

As depicted, frame 714 may also comprise structure 902. Structure 902 may provide additional support for hole measurement system 600. For example, without limitation, structure 902 may provide a base for biasing system 700 in FIG. 7 to attach to such that biasing system 700 may remain stable at a substantially same position when tip 608 of countersink measurement system 604 is moved.

In this illustrative example, tip 608 may have second position 904. Tip 608 may have second position 904 when tip 608 engages a countersink, such as countersink 322 in FIG. 3 and/or a countersink in countersinks 425 in FIG. 4. Tip 608 may be moved towards structure 718 when tip 608 engages the countersink.

Sensor 702 and sensor 704 in FIG. 7 may be configured to measure the amount of change between first position 609 in FIG. 6 and second position 904. In other words, sensor 702 and sensor 704 may be configured to measure how far tip 608 is moved towards structure 718 from first position 609 in FIGS. 6 and 7 to second position 904. This measurement may be a distance.

Hole measurement system 600 may use a known angle for the countersink and the measured distance for how far tip 608 moved towards structure 718 from first position 609 in FIGS. 6 and 7 to second position 904 to identify the diameter of the countersink.

Additionally, diameter measurement system 606 may also include sensor system 906. Sensor system 906 may be configured to generate data that may be used to identify a number of diameters for a hole, such as hole 316 in FIG. 3 and/or a hole in holes 408 in FIG. 4. The data may include, for example, without limitation, a measurement of how far probe 614 is extended beyond tip 608.

Figure 10:
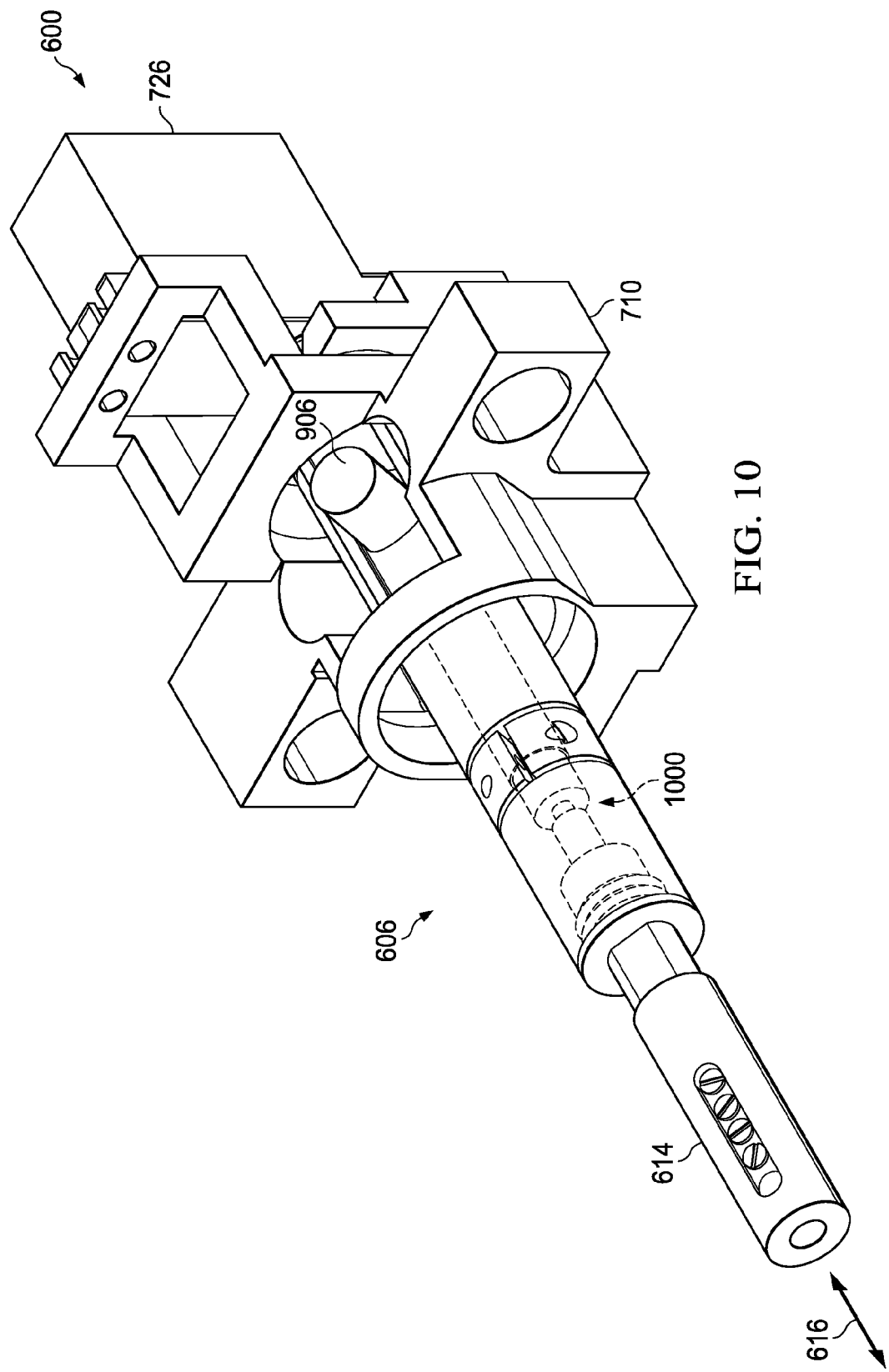
FIG. 10 is an illustration of a diameter measurement system for a hole measurement system in accordance with an advantageous embodiment.

Turning now to FIG. 10, an illustration of diameter measurement system 606 for hole measurement system 600 is depicted in accordance with an advantageous embodiment. In this illustrative example, sensor system 906 may comprise digital gauge 1000. Digital gauge 1000 may be configured to generate data that may be used to identify a number of diameters for a hole in which probe 614 may enter.

Figure 11:
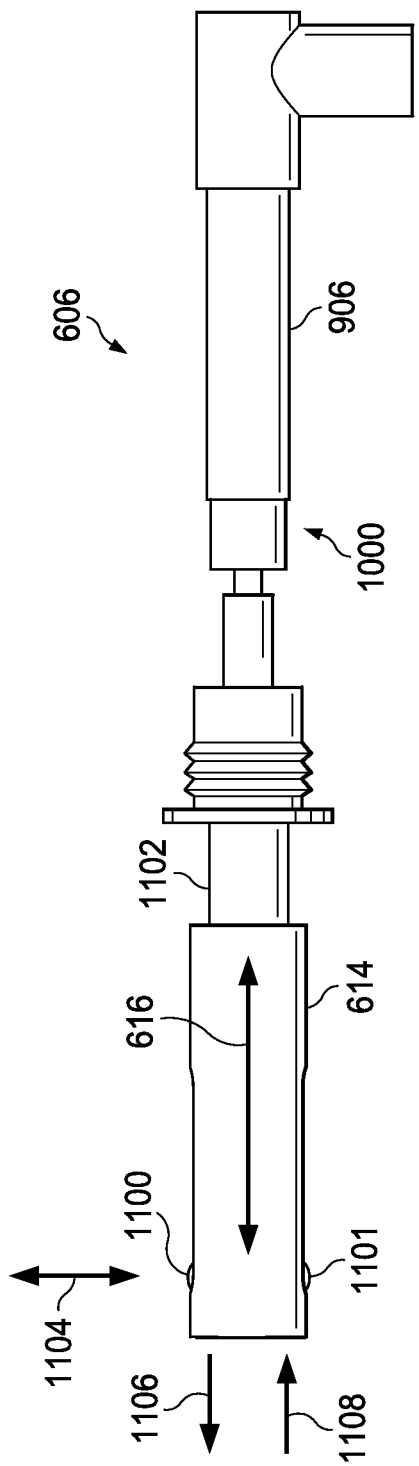
FIG. 11 is an illustration of a portion of a diameter measurement system for a hole measurement system in accordance with an advantageous embodiment.

With reference now to FIG. 11, an illustration of a portion of diameter measurement system 606 for hole measurement system 600 is depicted in accordance with an advantageous embodiment. In this illustrative example, carriage 710 from FIG. 7 may be removed such that a clearer view of probe 614 with sensor system 906 comprising digital gauge 1000 from FIG. 10 may be seen.

As depicted in this example, probe 614 may include ball 1100, ball 1101, and plunger 1102. As probe 614 is moved into a hole, ball 1100 and ball 1101 may come into contact with an edge of a channel for the hole at a first end of the channel. When this contact occurs, digital gauge 1000 generates data for a measurement of the diameter for the channel at a tip of plunger 1102.

Ball 1100 and ball 1101 may be moved in a direction substantially along axis 1104. As the diameter of a hole in which probe 614 enters changes, ball 1100 and ball 1101 may move in a direction along axis 1104. Movement of ball 1100 and ball 1101 may cause plunger 1102 to move along axis 616. Movement of plunger 1102 in a direction along axis 616 may cause movement of probe 614 in substantially the same direction along axis 616.

For example, without limitation, as the diameter of a hole increases, ball 1100 and ball 1101 may move in a direction along axis 1104 away from plunger 1102 such that plunger 1102 may move in the direction of arrow 1106. This movement of plunger 1102 may cause probe 614 to move in the direction of arrow 1106.

Further, movement of ball 1100 and ball 1101 in a direction along axis 1104 towards plunger 1102 may cause plunger to move in the direction of arrow 1108. This movement of plunger 1102 may also cause probe 614 to move in the direction of arrow 1108.

The movement of plunger 1102 may be sensed by digital gauge 1000 of sensor system 906. Digital gauge 1000 may measure how far plunger 1102 moves along axis 616. This measurement may then be used to identify the number of diameters for a hole in which probe 614 enters based on the specifications for probe 614 and plunger 1102. For example, without limitation, a movement of plunger 1102 of about 0.05 inches may correspond to a diameter for a hole of about 0.10 inches.

Figure 12:
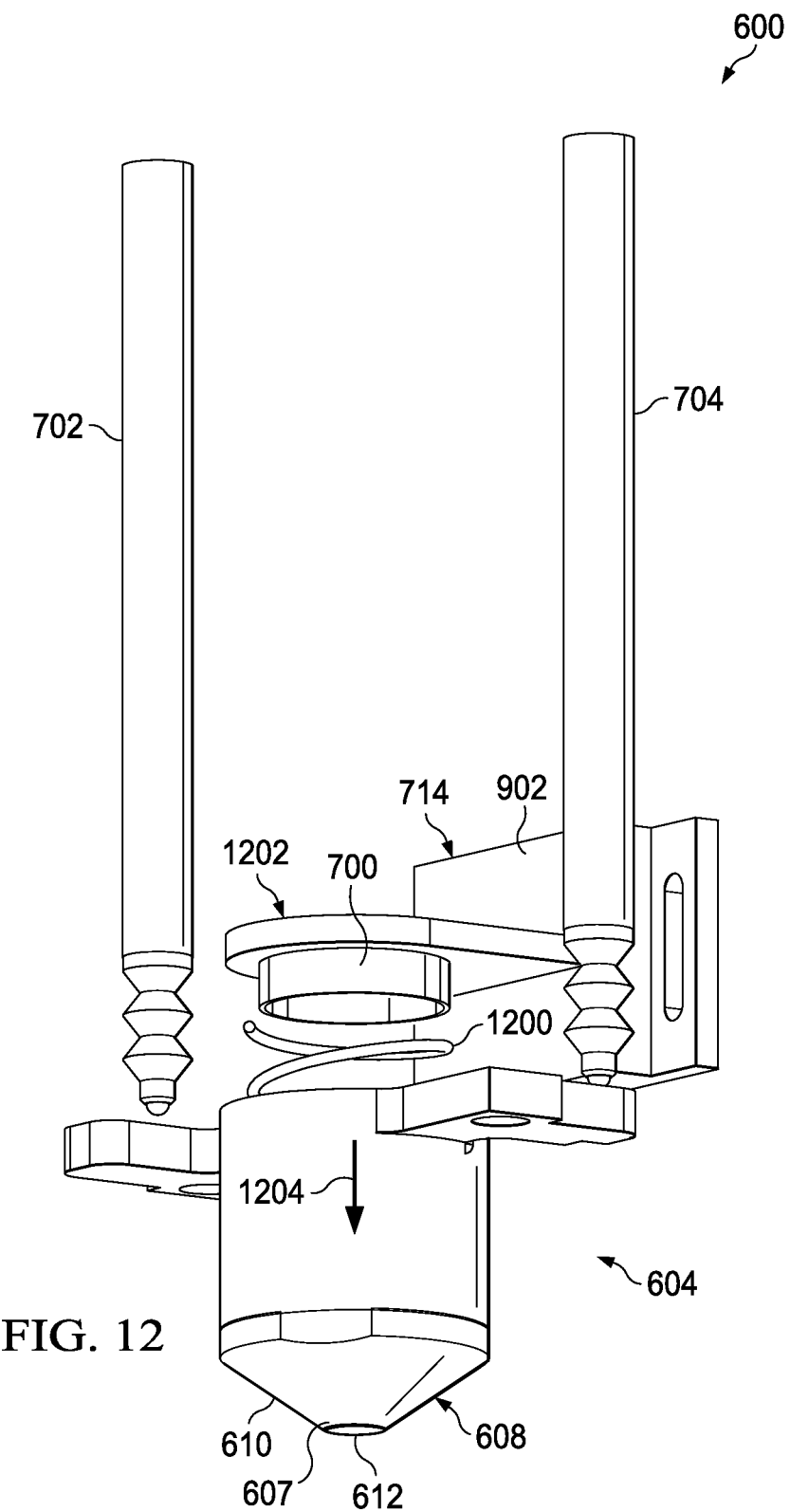
FIG. 12 is an illustration of a countersink measurement system for a hole measurement system in accordance with an advantageous embodiment.

Turning now to FIG. 12, an illustration of countersink measurement system 604 for hole measurement system 600 is depicted in accordance with an advantageous embodiment. In this illustrative example, biasing system 700 for countersink measurement system 604 may take the form of spring 1200 attached to support structure 1202. Spring 1200 may bias tip 608 in the direction of arrow 1204.

As depicted in this illustrative example, support structure 1202 may be associated with structure 902 of frame 714. In particular, support structure 1202 may be attached to structure 902. This attachment may provide stability for biasing system 700 such that movement of tip 608 may not cause movement of biasing system 700 and/or spring 1200 in an undesired manner.

The illustrations of hole measurement system 600 in FIGS. 6-12 are not meant to imply physical or architectural limitations to the manner in which different advantageous embodiments may be implemented. Other components in addition and/or in place of the ones illustrated may be used. Some components may be unnecessary in some advantageous embodiments.

Figure 13:
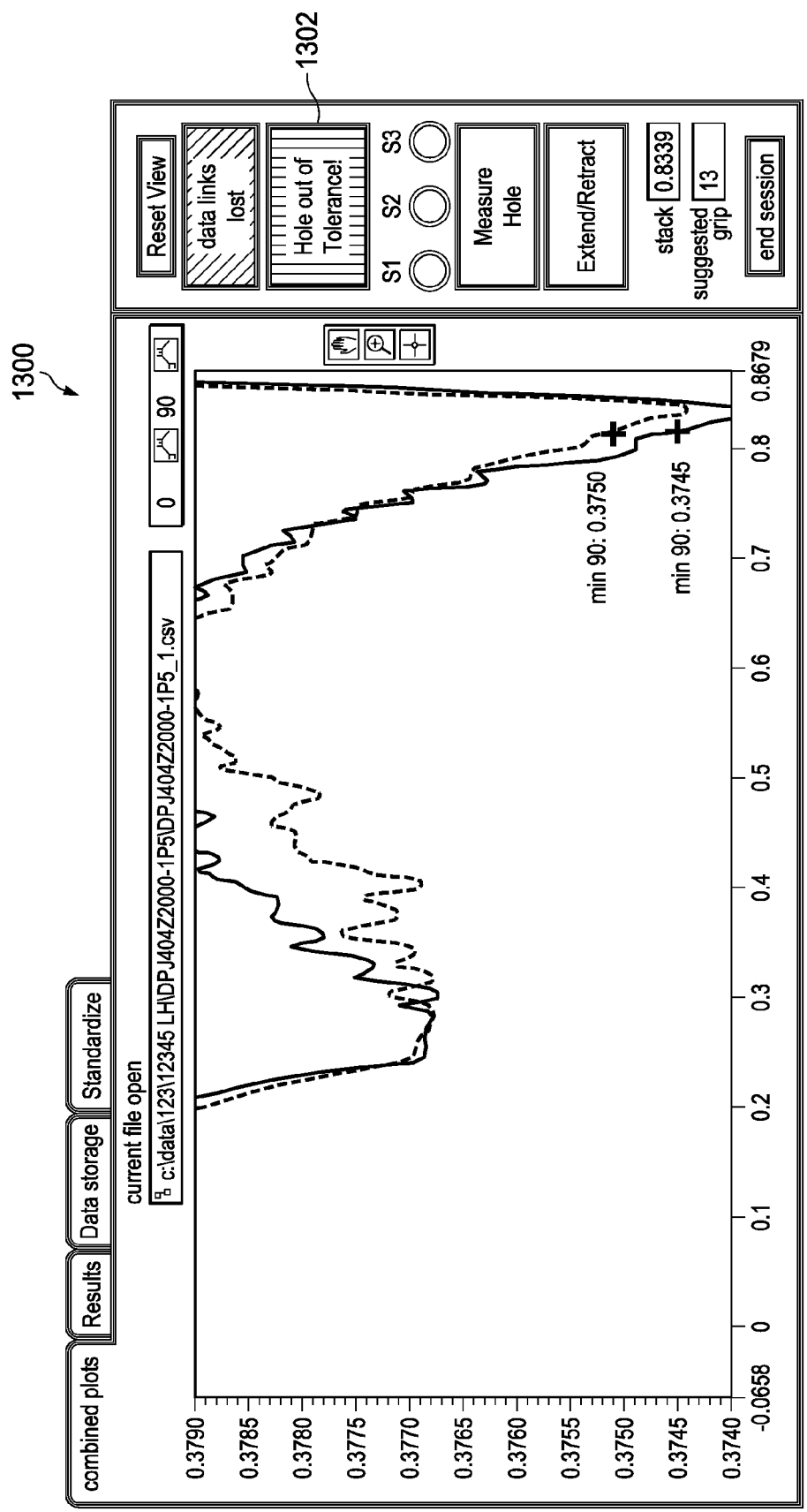
FIG. 13 is an illustration of a display of an indication in accordance with an advantageous embodiment.

With reference now to FIG. 13, an illustration of a display of an indication is depicted in accordance with an advantageous embodiment. In this illustrative example, display 1300 may be an example of one implementation for display 390 in FIG. 3. Display 1300 may be presented by, for example, without limitation, computer system 338 in FIG. 3 in response to measurement process 342 generating an indication, such as indication 346 in FIG. 3.

Display 1300 may present indication 1302 to an operator. Indication 1302 may indicate that a particular hole for which display 1300 is presented has at least one of a diameter of a countersink for the hole and a diameter for a channel for the hole not within selected tolerances.

Figure 14:
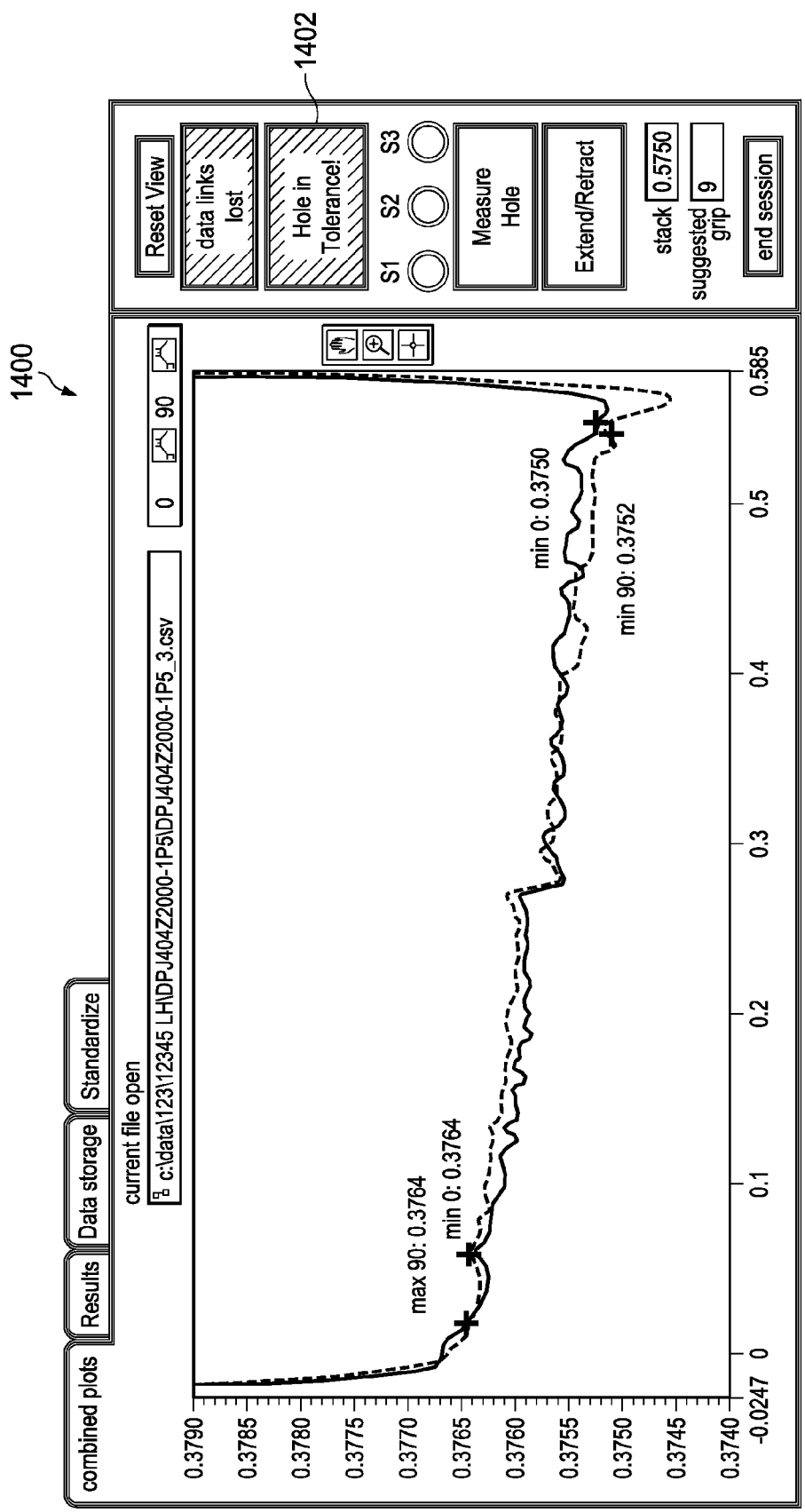
FIG. 14 is an illustration of a display of an indication in accordance with an advantageous embodiment.

With reference now to FIG. 14, an illustration of a display of an indication is depicted in accordance with an advantageous embodiment. In this illustrative example, display 1400 may be an example of one implementation for display 390 in FIG. 3. Display 1400 may be presented by, for example, without limitation, computer system 338 in FIG. 3 in response to measurement process 342 generating an indication, such as indication 346 in FIG. 3.

Display 1400 may present indication 1402 to an operator. Indication 1402 may indicate that a particular hole for which display 1400 is presented has diameters that are within selected tolerances.

Figure 15:
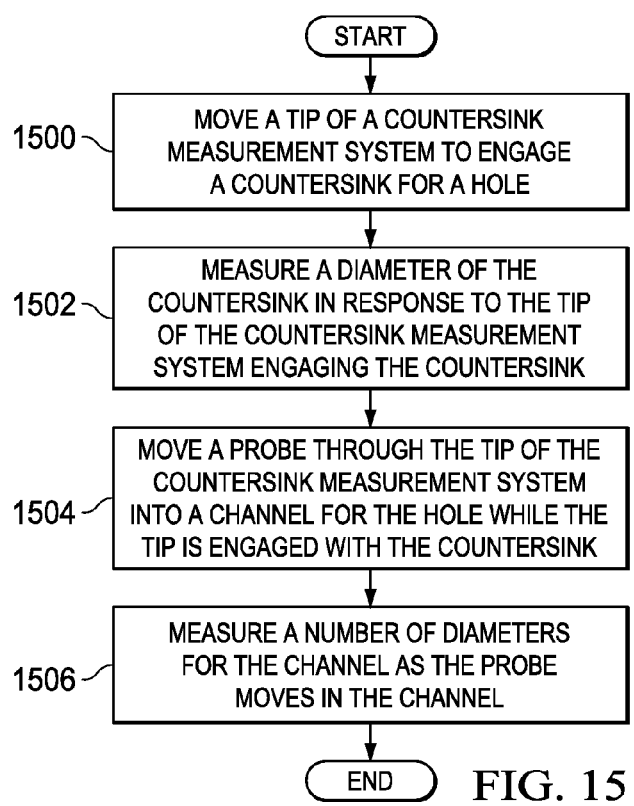
FIG. 15 is an illustration of a flowchart of a process for measuring holes in accordance with an advantageous embodiment.

With reference now to FIG. 15, an illustration of a flowchart of a process for measuring holes is depicted in accordance with an advantageous embodiment. The process illustrated in FIG. 15 may be implemented using hole measurement system 308 in hole measurement environment 300 in FIG. 3.

The process may begin by moving tip 350 of countersink measurement system 326 to engage countersink 322 for hole 316 (operation 1500). Countersink measurement system 326 may be part of hole measurement system 308. Hole measurement system 308 may also include diameter measurement system 328. Tip 350 may be a structure having conical shape 355 in this illustrative example. Thereafter, the process may measure diameter 330 of countersink 322 in response to tip 350 of countersink measurement system 326 engaging countersink 322 (operation 1502).

The process may then move probe 376 through tip 350 of counter measurement system 326 into channel 321 for hole 316 while tip 250 is engaged with countersink 322 (operation 1504). In operation 1504, probe 376 may move through channel 356 of tip 350 and through channel 321. Next, the process may measure number of diameters 332 for channel 321 as probe 376 moves in channel 321 (operation 1506), with the process terminating thereafter.

Diameter 330 and number of diameters 332 may be sent to computer system 338 for processing. Measurement process 342 may generate indication 346 of whether diameter 330 and number of diameters 332, and policy 344 are within selected tolerances.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments may provide a method and apparatus for measuring holes. In one advantageous embodiment, an apparatus may comprise a housing, a counter-measurement system associated with the housing, and a diameter measurement system associated with the housing. The countersink measurement system may comprise a tip configured to engage a hole with a countersink. The countersink measurement system may be configured to measure a diameter of the countersink for the hole when the tip is engaged with the hole. The diameter measurement system may comprise a probe. The diameter measurement system may be configured to move the probe along an axis extending through the tip of the countersink system into the hole when the tip is engaged with the hole. The diameter measurement system may also be configured to generate measurements for a number of diameters for the hole.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprises:
   a countersink measurement system having a tip and configured to measure a diameter of a countersink for a hole, the tip being configured to engage the countersink for the hole and the countersink measurement system being configured to measure the diameter of the countersink for the hole when the tip is engaged with the countersink; and
   a diameter measurement system associated with the countersink measurement system in which the diameter measurement system has a probe configured to measure a number of diameters for a channel in the hole, the diameter measurement system being configured to move the probe along an axis extending through the tip of the countersink measurement system into the channel for the hole when the tip of the countersink measurement system is engaged with the countersink and measure the number of diameters for the channel.

2. The apparatus of claim 1 further comprising:
   a processor unit configured to control operation of the countersink measurement system and the diameter measurement system.

3. The apparatus of claim 2, wherein the processor unit receives data for the diameter of the countersink and the number of diameters for the channel.

4. The apparatus of claim 2, wherein the processor unit is configured to generate an indication of whether the hole meets a requirement for the hole using the diameter of the countersink and the number of diameters measured for the channel for the hole.

5. The apparatus of claim 1, wherein in being configured to move the probe along the axis extending through the tip of the countersink measurement system into the channel for the hole when the tip of the countersink measurement system is engaged with the countersink and measure the number of diameters for the channel, the diameter measurement system is configured to move the probe through the tip of the countersink measurement system in a first direction along the axis into a first end of the channel towards a second end of the channel when the tip of the countersink measurement system is engaged with the countersink, move the probe in a second direction along the axis through the first end of the channel, and measure the number of diameters for the channel while the probe moves in at least one of the first direction and the second direction.

6. The apparatus of claim 5, wherein in being configured to move the probe through the tip of the countersink measurement system in the first direction along the axis into the first end of the channel towards the second end of the channel when the tip of the countersink measurement system is engaged with the countersink, move the probe in the second direction along the axis through the first end of the channel, and measure the number of diameters for the channel while the probe moves in the at least one of the first direction and the second direction, the diameter measurement system is configured to move the probe through the tip of the countersink measurement system in the first direction into the first end of the channel along the axis towards the second end of the channel when the tip of the countersink measurement system is engaged with the countersink, rotate the probe about the axis, move the probe in the second direction along the axis back out of the first end of the channel after rotating the probe, and measure the number of diameters for the channel while the probe moves in the at least one of the first direction and the second direction.

7. The apparatus of claim 1, wherein the countersink measurement system further comprises:
   a biasing mechanism configured to bias the tip of the countersink measurement system in a first direction along the axis, wherein the tip of the countersink measurement system is in a first position when the tip is not engaged with the countersink and in a second position when the tip of the countersink measurement system is engaged with the countersink; and
   a number of sensors configured to measure a movement of the tip of the countersink measurement system along the axis from the first position to the second position.

8. The apparatus of claim 1, wherein the diameter measurement system further comprises:
   a carriage, wherein the probe is associated with the carriage; and
   a motor configured to move the carriage along the axis.

9. The apparatus of claim 8, wherein the diameter measurement system further comprises:
   a number of rods, wherein the carriage is configured to move along the number of rods and the axis; and
   a ball screw connected to the motor and the carriage, wherein operation of the motor turns the ball screw to cause the carriage to move along the number of rods and along the axis.

10. The apparatus of claim 9, wherein the carriage is associated with a nut associated with the ball screw and wherein turning the ball screw causes the nut to move relative to the ball screw such that the carriage moves along the number of rods and along the axis.

11. The apparatus of claim 9, wherein the diameter measurement system further comprises:
   a rotational motor configured to rotate the probe about the axis.

12. The apparatus of claim 1, wherein the countersink measurement system and the diameter measurement system are associated with a housing in which the housing is configured to be held by a human operator.

13. The apparatus of claim 12, wherein the housing, the countersink measurement system, and the diameter measurement system form an end effector and wherein the housing is configured for attachment to a robotic machine.

14. The apparatus of claim 1, wherein the diameter measurement system is configured to measure a diameter of the channel about every 0.0005 inches.

15. The apparatus of claim 1, wherein the tip of the countersink measurement system is a structure having a conical shape.

16. A hole measurement system comprising:
   a housing;
   a countersink measurement system associated with the housing in which the countersink measurement system comprises:
      a tip configured to engage a countersink for a hole, in which the countersink measurement system is configured to measure a diameter of the countersink for the hole when the tip is engaged with the countersink and in which the tip of the countersink measurement system is a structure having a conical shape;
      a biasing mechanism configured to bias the tip of the countersink measurement system in a first direction along an axis, wherein the tip of the countersink measurement system is in a first position when the tip is not engaged with the countersink and in a second position when the tip of the countersink measurement system is engaged with the countersink; and
      a number of sensors configured to measure a movement of the tip of the countersink measurement system along the axis from the first position to the second position;
   a diameter measurement system associated with the housing in which the diameter measurement system is configured to measure a diameter of a channel for the hole about every 0.0005 inches and comprises:
      a probe, in which the diameter measurement system is configured to move the probe through the tip of the countersink measurement system in a first direction along the axis into a first end of the channel towards a second end of the channel when the tip of the countersink measurement system is engaged with the countersink, rotate the probe about the axis, move the probe in a second direction along the axis back out of the first end of the channel after rotating the probe, and measure a number of diameters for the channel while the probe moves in at least one of the first direction and the second direction;
      a carriage in which the probe is associated with the carriage;
      a motor configured to move the carriage along the axis;
      a number of rods, wherein the carriage is configured to move along the number of rods and the axis;
      a ball screw connected to the motor and the carriage, wherein operation of the motor turns the ball screw to cause the carriage to move along the number of rods and along the axis; and
      a rotational motor configured to rotate the probe about the axis;
   a processor unit configured to control operation of the countersink measurement system and the diameter measurement system; receive data for the diameter of the countersink and the number of diameters for the channel; and generate an indication of whether the hole meets a requirement for the hole using the diameter of the countersink and the number of diameters measured for the channel.

17. A method for measuring diameters of holes, the method comprising:
   moving a tip of a countersink measurement system to engage a countersink for a hole;
   measuring a diameter of the countersink in response to the tip of the countersink measurement system engaging the countersink;
   moving a probe through the tip of the countersink measurement system into a channel for the hole while the tip is engaged with the countersink; and
   measuring a number of diameters for the channel as the probe moves in the hole.

18. The method of claim 17, wherein the step of moving the probe through the tip of the countersink measurement system into the channel for the hole while the tip is engaged with the countersink comprises:
   moving the probe through the tip of the countersink measurement system into a first end of the channel in a first direction along an axis extending through the tip of the countersink measurement system towards a second end of the channel while the tip is engaged with the countersink; and
   further comprising:
   moving the probe in a second direction along the axis towards the first end of the channel.

19. The method of claim 18 further comprising:
   rotating the probe about the axis prior to moving the probe in the second direction along the axis towards the first end of the channel.

20. The method of claim 17 further comprising:
   generating an indication of whether the hole meets a requirement for the hole using the diameter of the countersink and the number of diameters for the channel.

21. A method for measuring diameters of holes, the method comprising:
   moving a tip of a countersink measurement system to engage a countersink for a hole;
   measuring a diameter of the countersink in response to the tip of the countersink measurement system engaging the countersink;
   moving a probe through the tip of the countersink measurement system into a first end of a channel for the hole in a first direction along an axis extending through the tip of the countersink measurement system towards a second end of the channel while the tip is engaged with the countersink;
   rotating the probe about the axis;
   moving the probe in a second direction along the axis towards the first end of the channel;
   measuring a number of diameters for the channel as the probe moves in the channel; and
   generating an indication of whether the hole meets a requirement for the hole using the diameter of the countersink and the number of diameters for the channel.

\* \* \* \* \*